July 17, 1934.  J. M. BIERER ET AL  1,967,142
RUBBERIZED BELTING AND METHOD OF MAKING THE SAME
Filed Feb. 3, 1933
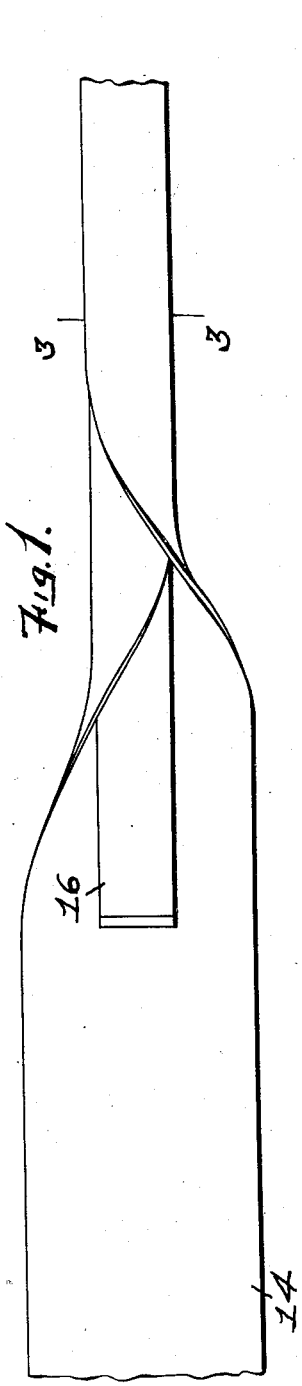
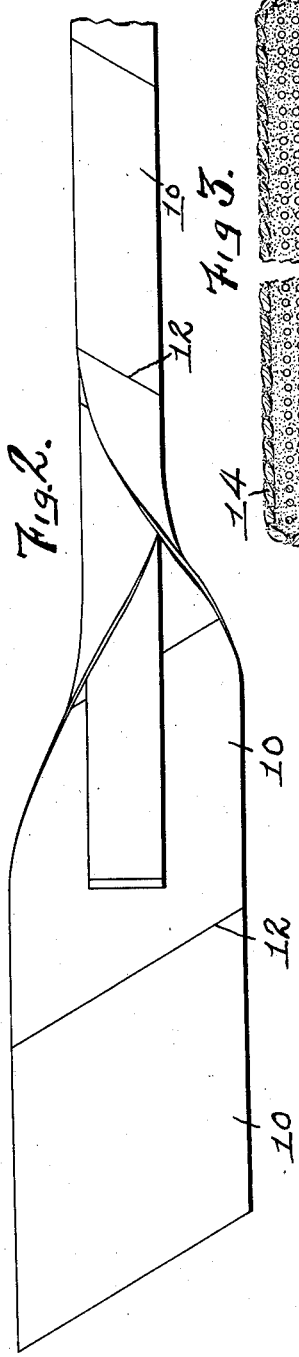
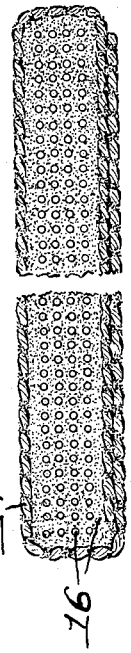
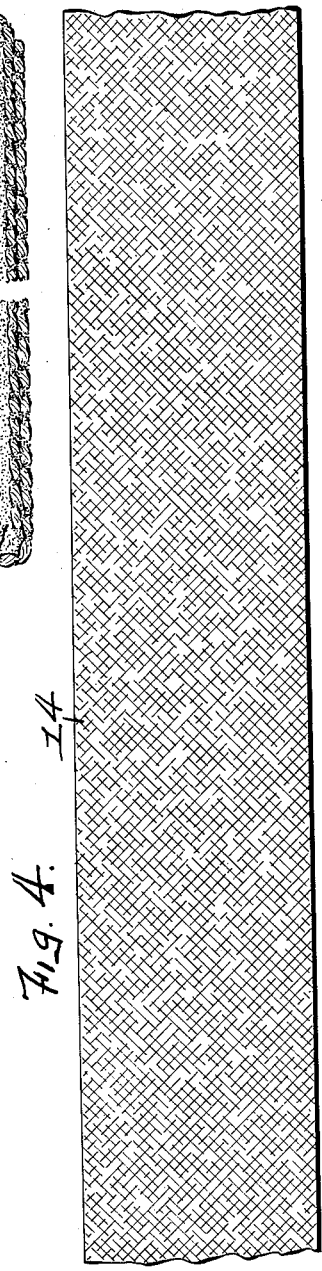
INVENTOR
John M. Bierer
Thomas M. Knowland
BY Jas. H. Churchill
ATTY.

Patented July 17, 1934

1,967,142

UNITED STATES PATENT OFFICE 1,967,142

RUBBERIZED BELTING AND METHOD OF MAKING THE SAME

John M. Bierer, Waban, and Thomas M. Knowland, Watertown, Mass., assignors to Boston Woven Hose & Rubber Company, Cambridge, Mass., a corporation of Massachusetts Application February 3, 1933, Serial No. 654,990

2 Claims. (Cl. 154—4)

This invention relates to rubber belting, and more particularly to rubber belting adapted for use in the transmission of power.

The object of the invention is to provide a novel and improved construction of rubber belting which may be economically manufactured, and is particularly characterized by its durability and by the absence from its surface of an excessive number of joints or splices.

With this object in view, and such others as may hereinafter appear, the invention consists in the rubber belting hereinafter described and particularly defined in the claims at the end of this specification.

In the drawing illustrating the preferred embodiment of the invention, Fig. 1 is a plan view illustrating the production of the present belting; Fig. 2 is a similar view illustrating the production of a comparable belting of the prior art; Fig. 3 is a cross-sectional view taken on the line 3—3 of Fig. 1; and Fig. 4 is a plan of a portion of the cover member used in producing the present belt.

Prior to the present invention rubber transmission belting has been constructed of a multiply rubberized cotton fabric designed to withstand both the continual flexing and abrasion incident to travelling around pulleys, and also to withstand the continual tension of power transmission. Such transmission belting has usually comprised a cover member of rubberized fabric wrapped about an inner rubberized core member. The outer or cover member is required to withstand the wear, while the inside structure or core member is designed to carry the tension and is not exposed to wear. The inner side of the cover member is exposed to abrasion and wear resulting from surface motion due to slippage, creep, to the crown on the pulleys, and to the mechanical defects in pulleys and in pulley alignment, while the outer side of the cover member is exposed to maximum stretching and flexing incident to bending around the pulleys. Both the cover member and the inner or core member are subjected to the strains of belting tension in the transmission of power, and experience has shown it to be a fact that a rubberized structure when subjected to tension possesses a reduced abrasion resistance and that therefore superior transmission belting may be produced when the cover member is arranged so that during the use of the belting minimum tension exists in the threads making up the fabric of the cover member.

In order to secure this result, it has heretofore been proposed to construct the cover member of a strip of rubberized fabric produced by joining together end for end a relatively large number of individual short lengths 10 (see Fig. 2) of rubberized fabric cut on the bias. Because of inherent limitations in the obtainable commercial widths of woven fabrics from which the individual pieces 10 of such bias fabric may be cut, commercial belting produced in this manner possesses an inherent large number of splices or joints 12 (Fig. 2) in the surface or cover member thereof. The usual practice has been to sew together the individual strips of the cut bias fabric in order to produce a sufficient length of cover member suitable for making a commercial belt, and as a result the continuity and smoothness of the surface of the cover member has been interrupted every few feet by the aforesaid splices and the rows of stitching or other means employed in securing together the individual pieces of the bias cut fabric.

The chief disadvantage in this type of belt has consisted in the stitching required in securing together the individual pieces of the bias cut fabric, although attempts have been made to reduce the effect of the stitching by the use of frictioned fabric applied over the stitching. Both the stitching and the frictioned fabric increase the gauge of the belt at each splice or joint, resulting in severe local wear when the belt impinges upon the pulley. The advantage of this type of belt lies in the extreme stretchiness of the cover ply, allowing it to stretch by means of a change in angularity between the warp and filler components of the woven fabric and with a minimum resulting stress in these members. The cover member is therefore exposed to wear under conditions of relaxed tension and the surface life of the belting is greatly increased by the character of cover member employed.

An attempt has also been made to provide a satisfactory belting in which the cover member is composed of plies of rubberized cord fabric, joined together by stitching or otherwise, and with the cords extended in a direction at right angles to the travel of the belting. This type of belt possesses the inherent disadvantages of the belting above described with respect to the large number of splices or joints in the surface of the cover member, and the reduction in the durability of the belt from this cause.

In both of the described types of belting the cover member does possess an inherent elasticity which enables the cover member to wear under the conditions of relaxed tension.

In accordance with the present invention the cover member of the present belt is produced of a strip 14 of fabric initially woven on the bias. This initially woven bias fabric may be produced in accordance with known practice and in known forms of apparatus, and inasmuch as such fabric in itself forms no part of the present invention, further description of its manufacture is deemed unnecessary. It is thought to be sufficient for an understanding of the present invention to state that such initially woven bias fabric is a commercially obtainable article of commerce and is available in any desired lengths. The initially woven bias fabric is to be clearly distinguished from a cut bias fabric particularly in respect to available continuous lengths thereof. Because of limitations in the commercially available widths of ordinary woven fabric from which a bias fabric may be cut, the longest length of an individual piece of cut bias fabric never exceeds a few feet, whereas with an initially woven fabric a continuous strip of any desired length, as for example 100 feet or more, may be obtained.

In accordance with the present invention it is preferred to first rubberize the woven bias fabric 14, and because of the flimsy and elastic nature of the initially woven bias fabric and the difficulty with which the same may be handled, it is preferred to first pass the fabric through any suitable device for winding and rewinding the fabric under tension. The fabric is then allowed to stand in roll form until it takes a set and is permanently reduced in width. The fabric thus treated may then be rubberized in the usual manner, without wrinkling at the edges, and subsequently used with advantage in the production of the present belting. In constructing the belt we prefer to form a core 16 in any usual or preferred manner, such for example as by a plurality of plies of rubberized cord fabric, and thereafter the belt manufacture may proceed in accordance with known practice involving the wrapping of the rubberized strip 14 of initially woven bias fabric around the core member 16 and the pressing together and curing of the belt in the usual form of presses and in accordance with known practice.

The improved belting produced as above described is characterized by its durability, resulting particularly from the inherent characteristics of the initially woven bias fabric cover member, and also from the fact that substantially long lengths of the belt may be produced free from splices or joints, thus eliminating excessive local wear upon the stitching or other means heretofore employed in securing together the individual short pieces of cut bias fabric.

While it is preferred to construct a belt in which only a single joint is provided where the ends of the belt are joined together to form an endless belt, nevertheless it will be understood that the invention is not to be limited to the preferred construction.

Having thus described the invention, what is claimed is:—

1. As a new article of manufacture, a rubberized fabric belting stock comprising a core member and a cover member, said cover member comprising an unspliced rubberized initially and tightly woven bias fabric.

2. The method of making a rubberized fabric belting, which consists in first permanently reducing the width of a relatively long strip of unspliced initially and tightly woven bias fabric by winding the fabric under tension and maintaining it in roll form until it has taken a set, then rubberizing the fabric, then wrapping the unspliced rubberized fabric thus produced about a core member and subjecting the belting thus formed to vulcanization.

JOHN M. BIERER.
THOMAS M. KNOWLAND.